INVENTOR
RAYMOND M. WILMOTTE

BY Hyman Hurwitz
his ATTORNEY

Sept. 2, 1952 R. M. WILMOTTE 2,609,494

FREQUENCY MODULATION SYSTEM FOR RECEIVING ONE OF TWO OVERLAPPING WAVES

Filed Jan. 24, 1950 2 SHEETS—SHEET 2

INVENTOR
RAYMOND M. WILMOTTE

BY Hyman Hurwitz his ATTORNEY

Patented Sept. 2, 1952 2,609,494

UNITED STATES PATENT OFFICE 2,609,494

FREQUENCY MODULATION SYSTEM FOR RECEIVING ONE OF TWO OVERLAPPING WAVES

Raymond M. Wilmotte, Washington, D. C., assignor to Padevco, Inc., Washington, D. C., a corporation of Delaware Application January 24, 1950, Serial No. 140,243

7 Claims. (Cl. 250—20)

This invention relates generally to apparatus and methods for the separation of signals overlapping in frequency, and more particularly to methods and apparatus for selectively separating two overlapping frequency modulated carriers.

It is a broad object of the present invention to provide novel methods and apparatus for selectively separating two frequency modulated signals, which overlap in frequency, and which are of different amplitudes.

It is another broad object of the invention to provide a system for detecting modulation inherent on a first frequency modulated carrier in the presence of another weaker overlapping frequency modulated carrier, with substantially no interference from the latter.

It is still another object of the present invention to provide a system for varying the phase of two overlapping frequency modulated carriers to such degree and in such sense as to eliminate phase shifts of the sum of the carriers due to the presence of the weaker of the frequency modulated carriers.

The above and still further objects, features, and advantages of the present invention will become apparent upon consideration of the following description of a specific embodiment of the invention, especially when taken in conjunction with the accompanying drawings, wherein.

Briefly described, in the present invention, two overlapping frequency modulated signals, one of which is of smaller amplitude than the other, are applied to a limiter circuit in conventional fashion, the output of the limiter being applied, however, to an electronic phase shifter which, in response to control signals, is capable of shifting the phase of the superposed carriers. The output of the phase shifter is then limited and detected in a frequency discriminator in conventional fashion, and if the phase shifting is properly carried out, the output of the ultimate discriminator detector will be the stronger of the two signals, from which the weaker will be absent, or substantially absent, or at least very materially reduced.

Figure 1:
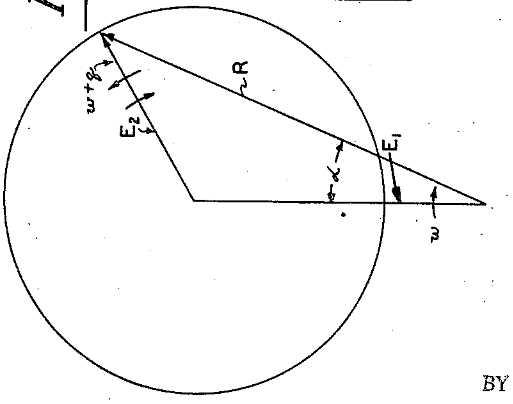
Figure 1 is a vector diagram of two overlapping frequency modulated carriers, of different amplitudes, which is utilized in explaining the theoretical basis of the present invention.

I have found that the phase shift, $a$, of the resultant vector R, relative to the vector of the strong signal, produced by the superposition of two overlapping frequency modulated carriers of different amplitudes (see Figure 1), undergoes an angular rate of change given to a close approximation by $$\frac{1}{q}\frac{dR}{dt}$$

where $q$ is the beat frequency between the carriers, and the rate of change of phase is measured in radians per second. This approximation is good even for values of $$\frac{E_1}{E_2}$$

close to unity. Accordingly, if a voltage proportional to $$\frac{1}{q}\frac{dR}{dt}$$

is applied to the phase shifting network mentioned in the previous paragraph, to shift the phase of a vector R in such sense as to reduce the shift in phase caused by the weaker of the signals, the output of the phase shifting circuit contains essentially only those phase and frequency variations due to the modulation of the stronger of the signals.

In accordance with one embodiment of the invention, a signal proportional to $$\frac{1}{q}$$

is derived, a further signal proportional to $$\frac{dR}{dt}$$

is also derived, and the two signals are multiplied together, thus obtaining a resultant signal proportional to the product. It is further necessary to derive a sensing voltage which determines whether the frequency of the weaker signal $w+q$ is above or below the frequency of the stronger signal $w$, i. e., to determine whether $q$ is positive or negative in respect to algebraic sign. The sensing voltage then establishes the sense in which the product function will be applied to the electronic phase shifter, and therefore the algebraic sign of the phase shift which is introduced by the phase shifter. Thereby, the product voltage having the proper magnitude and sign, the necessary phase shifts in the resultant vector will be caused to occur. Obviously the product $$\frac{1}{q}\frac{dR}{dt}$$

may also be obtained by a process of division, i. e., by obtaining $q$ and $$\frac{dR}{dt}$$

and carrying out the process $$\frac{\frac{dR}{dt}}{q}$$

Figure 2:
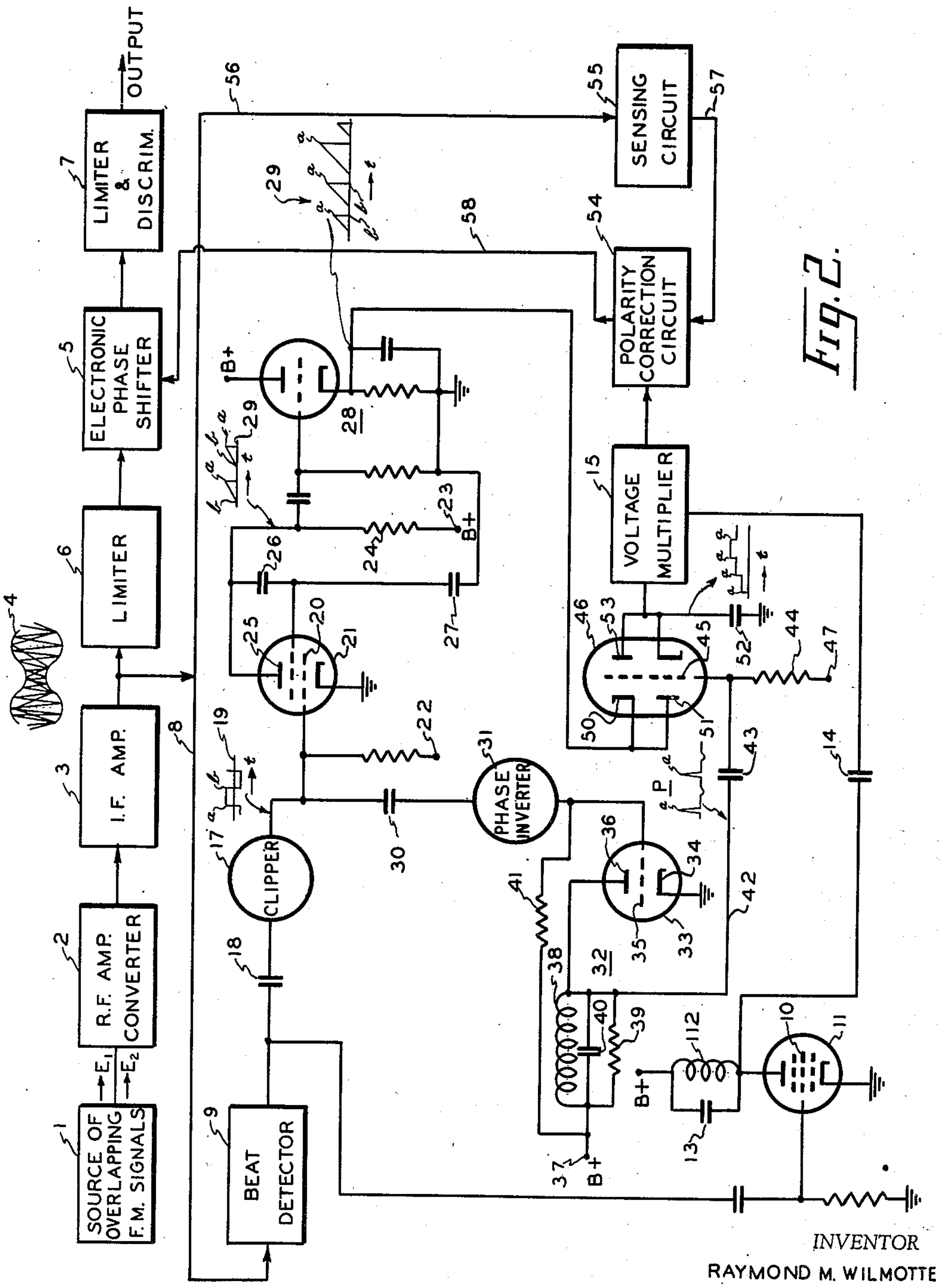
Figure 2 illustrates in schematic circuit diagram one mode of realization of the invention.

Referring now more specifically to Figure 2 of the drawings, the reference numeral 1 denotes a source of two overlapping frequency modulated signals, $E_1+E_2$, one of which, $E_1$, may be assumed to be stronger than the other. The output of the source 1 may be applied to a radio frequency amplifier and converter 2 in conventional fashion, for heterodyning of the resultant signal to an intermediate frequency suitable for amplification in intermediate frequency amplifier 3.

The output of the intermediate frequency amplifier 3 is then a signal which may be represented by a vector R, equal at each instant to the sum of the vectors $E_1$ and $E_2$, representing the original two overlapping frequency modulated signals, or representing the beat envelope of the two signals, as illustrated at 4. The sum of the two vectors $E_1$ and $E_2$ may be represented completely by the expression $R \sin (wt+\alpha)$, where R is the vector sum of $E_1$ and $E_2$, $\alpha$ the angle between R and $E_1$, and $w$ the frequency of the vector $E_1$.

It is well known that if the resultant vector R be limited in amplitude by means of a limiter, of the character conventionally utilized in frequency modulation receivers, the vector $E_2$ may be substantially clipped from the vector R, leaving the vector $E_1$, with distortion produced by the change in the value of $\alpha$ as the vector $E_2$ moves relative to the vector $E_1$. This distortion reaches a maximum value when the vector $E_2$ rotates into phase opposition with the vector $E_1$ and passes through parallelism with the vector $E_1$. At such times an extremely rapid change of phase angle of the vector R takes place, especially when the ratio of amplitudes of $E_1$ and $E_2$ is close to unity. This rapid change of the angle is equivalent to a rapid change in frequency for a short time interval. It will be clear then that the presence of the weaker signal causes periodic or recurrent short time frequency variations or frequency deviations, which constitute a distortion of the stronger signal $E_1$, by virtue of the presence of the superposed weaker signal $E_2$. I have shown that the phase shift relative to the strong signal of the resultant vector R undergoes an angular rate of change, given to a close approximation, by $$\frac{1}{q}\frac{dR}{dt}$$

If a voltage proportional to $$\frac{1}{q}\frac{dR}{dt}$$

is applied to an electronic phase shifter, 5, after the beat envelope 4 has been limited in amplitude in an amplitude limiter 6, the phase of the resultant voltage R may be shifted in a direction and amount opposite to that causing the disturbance, thereby eliminating the latter.

As a result the instantaneous frequency deviations previously mentioned do not occur, and the signal impressed on the limiter and discriminator 7, when detected therein, produces the desired modulation of the stronger signal free from interference due to the undesired frequency deviations.

In order to accomplish the required phase shifting of the resultant vector R by means of the electronic phase shifter 5, it is essential, in accordance with the present invention, to develop a voltage proportional to $$\frac{1}{q}\frac{dR}{dt}$$

This is accomplished by developing a voltage proportional to $$\frac{dR}{dt}$$

and a further voltage proportional to $$\frac{1}{q}$$

and multiplying the two voltages to produce a resultant voltage proportional to $$\frac{1}{q}\frac{dR}{dt}$$

or by developing a voltage proportional to $q$ and a voltage proportional to $$\frac{dR}{dt}$$

and obtaining the ratio.

To produce a voltage proportional to $$\frac{dR}{dt}$$

the resultant voltage R is applied via lead 8 to a detector 9 to obtain the envelope thereof, and thence to the control electrode 10 of a pentode 11, which is anode loaded by means of an inductance 12. The latter may be constructed to have a high inductance for the frequency at which R varies in amplitude, and may be shunted with capacity 13 so as to carry no appreciable R. F. voltage. Accordingly, there is developed across inductance L a voltage proportional to $$\frac{dR}{dt}$$

This voltage is applied via a D.-C. blocking and signal coupling condenser 14 to a multiplier 15.

The voltage R, i. e., the envelope of superposed waves $E_1$ and $E_2$, is further supplied to a clipper 17 via a coupling condenser 18, so that at the input of the clipper 17 is applied an alternating voltage corresponding with the envelope of R, and having zero D.-C. components, while at the output of the clipper 17 is generated a square wave, or substantially a square wave, having substantially no D.-C. component, and having positively going portions $a$ and negatively going portions $b$, which slope relatively sharply, the total square wave being identifiable by the reference numeral 19. The square wave 19 is applied to a control electrode 20 of a tetrode 21 which operates as part of a saw tooth generator. More specifically, the tetrode 21 is so biased by means of a bias source 22, that in response to the positive portions of the wave form 19 the tube is conductive while in response to the negative portions thereof, the tube is cut off or non-conductive. The tetrode 21 accordingly is always in one condition or the other, either cut off or conductive, and if conductive is arranged to have a very low internal resistance. Anode supply for the tetrode 21 is provided from a source 23 via a charging resistance 24, and there is connected between the anode 25 of tetrode 21 and ground a charging condenser 26 and a by-pass condenser 27 in series. Accordingly, while the tetrode 21 is blocked the condenser 26 charges from the voltage source 23, the charging current flowing in the resistance 24 being substantially of saw tooth form. On the other hand, when the tetrode 21 becomes conductive, due to its low internal resistance, the total voltage across the condenser 26 becomes substantially zero, since the condenser 26 is essentially short circuited, and the saw tooth voltage accordingly rapidly decays to substantially zero or ground value. The condenser 26 remains discharged while the wave form 19 is positive, i. e., from *a* to *b*, but upon reaching a point in the wave 19 such as is represented by *b*, a second charging cycle commences.

The voltage developed across the resistance 24 is transferred to a cathode follower 28, across the load circuit of which is then developed a replica of the saw tooth wave form corresponding with current flow in resistance 24. Since the wave form 19 consists of successive portions having positive and negative segments of unequal length or duration, the saw tooth waves generated in the load circuit of the cathode follower 28 will similarly consist of saw tooth voltages of varying heights and spacings as indicated at 29. It will, nevertheless, be true that each saw tooth wave will have the same slope as any other saw tooth wave, since in each case the time constant of the charging circuit comprising resistance 24 and condenser 26 remains unchanged. It will further be true that each saw tooth wave will commence to build up at times *b* of the wave form 19 and will decay to zero at times *a* of the wave form 19. Accordingly, the maximum height which is reached by any of the saw tooth wave forms comprising the wave 29 is proportional to $$\frac{1}{q}$$

since the higher is *q*, the shorter is the time interval between points *a* and *b* of wave form 19, or between points *b* and *a* of wave form 19. It then becomes necessary merely to obtain a measure of the peak values of the saw teeth of the wave 29 in order to obtain a measure of $$\frac{1}{q}$$

I have accordingly provided circuits for sampling the wave 29 at the peak of each saw tooth thereof. To this end I apply the wave form 19 at the output of the clipper 17 via a coupling condenser 30 and a phase reversing tube 31 to a shock excited pulser 32. The latter comprises a triode 33 having a grounded cathode 34, a control electrode 35 and an anode 36. The anode 36 is connected to a source of B+ voltage 37 via a choke 38, which is by-passed by a damping resistance 39, and which includes some inherent capacity 40.

The electrical constants of the inductance 38 and its associated damping resistance 39 and capacity 40 are such that the circuit is critically damped, thus to produce essentially one-half cycle upon sudden discharge of the energy stored in inductance 38. The operating frequency of the circuit being approximately 1 megacycle, the pulse produced by the discharge of the inductance 38 lasts for a time interval of the order of 1 microsecond, taking the form illustrated at P, and the positive peaks occurring at points *a*.

The control electrode 35 is biased by applying B+ voltage from the source 37, via a resistance 41, directly to the control electrode 35, which is unby-passed and unconnected to ground, but which may be assumed, nevertheless, to have inherent internal resistance between the cathode 34 and the control electrode 35. The internal resistance, when considered in series with resistance 41, constitutes a voltage divider circuit, so that a definite proportion of the B+ voltage is impressed between control electrode 35 and cathode 34, and so that the latter is normally positive. Due to the presence of the phase inverter 31 the wave form 19 as applied to the control electrode 35 consists of negatively poled portions subsisting from point *a* to point *b*, and positively poled portions from point *b* to point *a*. During the positively poled portions the triode 33 is conductive and current flows in the inductance 38. Upon effecting a transition from positive to negative, i. e., at the points *a* of the wave form 19, current flow in the inductance 38 is suddenly terminated, since the triode 33 becomes non-conductive. The energy stored in the inductance 38 then discharges, as has been explained hereinbefore. The discharge requires an extremely short interval of time, of the order of one microsecond, and the voltage induced by the discharge is in such direction, in accordance with Lenz's law, as to render the anode 36 positive during the discharge.

The positive potential is transferred by a lead 42 and coupling condenser 43 across a resistance 44, which is utilized as a coupling resistance for transferring the voltage generated by discharge of the inductance 38 to the control electrode 45 of a double triode 46, connected with the separate triode sections in back-to-back relation. Additionally, the control electrode 45 is connected to a source of bias voltage 47, which serves normally to cut off the triode sections. The voltage impressed across the coupling resistance 44 by discharge of the inductance 38 is of sufficient magnitude to render the triode sections conductive. One cathode 50 and a corresponding anode 51 of the double triode 46 are tied together and connected to the positive end of the load resistance of the cathode follower 28, and accordingly have impressed thereon the wave 29. Nevertheless, since the double triode 46 is normally non-conductive the voltage represented by the wave form 29 causes no current to flow through the double triode. However, when the gating voltage developed across resistance 44 is impressed on the control electrode 45 of the double triode 46, current flows therethrough in response to the then voltage of the wave form 29. The peaks of the wave form 29 occur at times *a* of the wave 19, and it is precisely at these points *a* that the inductance 38 discharges and applies a positive gating pulse to the double triode 46, causing the latter to become conductive. A pulse of current then flows through the double triode 46, charging the condenser 52 with its ungrounded end positive, and the total charge of the condenser 52 is such that the voltage across the condenser 52 is substantially the voltage of the wave form 29 at the peak of a saw-tooth. The double triode 46 cuts off immediately, the gating pulse ceases, and the charge impressed on the condenser 52 remains trapped until a succeeding gating pulse occurs. When this occurs the then existing saw-tooth of the wave 29 may be larger or smaller than the preceding saw-tooth. If larger, additional voltage charge is added to the condenser 52, boosting its voltage accordingly. If smaller, the condenser 52 discharges through the double triode 46 via the anode 53 and cathode 50, and the total voltage across the condenser 52 accordingly decreases. It will then be seen that the condenser 52 maintains continuously a voltage substantially equal to the maximum voltage of the last saw-tooth of the wave 29. The voltage available across the condenser 52 is applied to an input circuit of the voltage multiplier 15, and since the peaks of the saw-teeth of the wave 29 reach values proportional to $$\frac{1}{q}$$

so the voltage applied to the voltage multipler 15 and deriving across the condenser 52 similarly is at all times proportional to $$\frac{1}{q}$$

The voltage multiplier 15 multiplies the two voltages applied thereto, one of which is proportional to $$\frac{dR}{dt}$$

and the other to $$\frac{1}{q}$$

and in its output circuit provides a product voltage. This product voltage is impressed on a phase reversing circuit 54 which is controlled in turn by a sensing circuit 55. The latter is controlled to provide a sensing voltage in response to the wave form R, which is applied thereto via lead 56 from I. F. amplifier 3. The circuits 54 and 55 correspond to those disclosed in my application for U. S. patent Serial #133,871, entitled "F. M. System I," filed December 19, 1949. Reference is made particularly to Figure 4 of that application, wherein is shown a gating wave generator control circuit 8 and a gating wave generator 24, which constitute the sensing circuit 55 of the present application, and which generate a gating wave which appears on the lead 57 in accordance with whether the frequency of the weaker signal $E_2$ of the two signals $E_1$ and $E_2$ is higher or lower in frequency than is the stronger signal $E_1$. The reversing circuit 54 of the present application corresponds to the phase inverter 31 and the polarity correction gating circuit 30 of Figure 4 of my application, Serial #133,871, filed December 19, 1949, and serves accordingly to determine the phase of the output of the voltage multiplier 15 as it appears at the output of the polarity correction circuit 54 in accordance with the sensing voltage provided by the sensing circuit 55. It will be recalled that in the above-identified prior application it was the phase of a beat frequency as provided by beat frequency detector and discriminator 4 which was to be corrected. In the present application, however, it is the output of a voltage multiplier 15 which is to be corrected. In either event the circuits operate identically, and detailed circuits corresponding with the block diagram of Figure 4, as well as a full exposition of the principles upon which those circuits operate, is provided in the aforementioned application, and its provision herein would therefore be repetitious.

The output of the polarity correction circuit 54 is applied via a lead 58 to phase shifter 5 and serves to shift the phase of the signal at the output thereof with respect to the phase of the signal at the input thereof. The output of the voltage multiplier 15 is of proper magnitude to reduce the phase between the resultant vector R and the vector representative of the stronger signal $E_1$ to zero, provided the voltage is of proper polarity to effect a phase shift in the proper direction. The polarity of the voltage applied over the lead 58 is controlled in accordance with the direction of rotation of the vector $E_2$ by the polarity circuit 54 and the sensing circuit 55. Accordingly, the output of the limiter and discriminator 7 will consist of the stronger signal $E_1$ without any distortion due to phase shifts caused by the presence of the weaker signal, and accordingly without distortion caused by sudden frequency shifts of the resultant of the two overlapping signals.

Essentially, in accordance with the present invention, the resultant vector R remains always in phase with the stronger signal $E_1$ at the output of the phase shifter 5, and the presence of the weaker signal does not distort the stronger signal in respect to frequency variations thereof.

Figure 3:
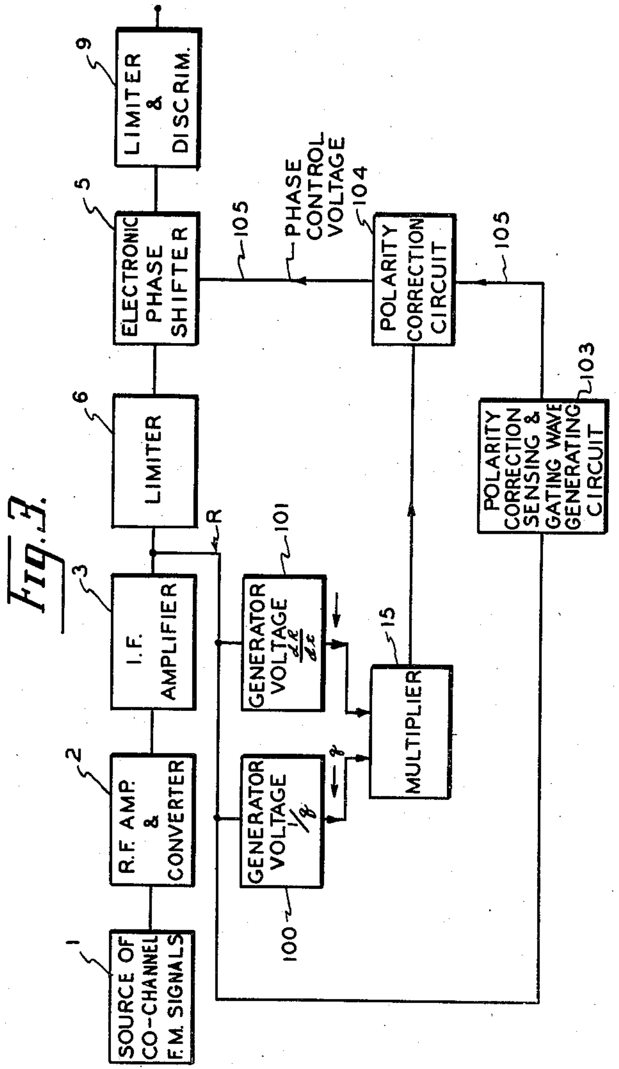
Figure 3 illustrates in functional block diagram the essential elements of the invention, as illustrated in the schematic circuit diagram of Figure 2.

Reference is now made to Figure 3 of the accompanying drawings wherein is illustrated in functional block diagram a system corresponding with the detailed circuit diagram of Figure 2 of the accompanying drawings. It will be perceived that the two overlapping frequency modulated waves $E_1$, $E_2$ proceed from a source of such waves, such as an antenna or transmission line, to a radio frequency amplifier and converter 2, which provides at its output an intermediate frequency signal corresponding with superposed or overlapping signals $E_1$ and $E_2$, these latter then being amplified in an intermediate frequency amplifier 3. The output of the intermediate frequency amplifier is applied to a limiter 6, which clips the wave $E_2$, assumed to be the weaker of the two signals, from the wave $E_1$, leaving the wave $E_1$, with, however, phase shifts introduced by the presence of the wave $E_2$. Otherwise stated, the output of the limiter 6 corresponds with the resultant vector R, after the latter has been clipped to remove amplitude variations thereof due to the superposition of the vectors $E_1$ and $E_2$. It will be noted that a phase angle exists between the vector R and the vector $E_1$ which is continually varying both in algebraic sign and in magnitude, since it is caused by the original superposition of the two waves $E_1$ and $E_2$, which may be assumed in general to be unrelated.

In accordance with the present invention the output of the I. F. amplifier 3 is applied to a device 100 which generates a voltage proportional to $$\frac{1}{q}$$

where $q$ is the frequency difference between the two voltages $E_1$ and $E_2$. The polarity of the output of the device 100 is always positive, as will be evident from a discussion of the system of Figure 2, regardless of the algebraic sign of q. There is further developed in a generator 101 a voltage proportional to $$\frac{dR}{dt}$$

which may be derived by a simple differentiation process from the wave R. The output of the generator 101 is of random polarity. The output of the generator 101 is applied to a multiplier 15 which provides at its output a voltage proportional in amplitude to $$\frac{1}{q}\frac{dR}{dt}$$

It will readily be realized that it is essential to introduce, in order to compensate for phase shifts for the vector R which are due to the presence of the signal $E_2$, compensating phase shifts of either polarity as the instantaneous situation may require. From this fact alone it will be realized that the output of the multiplier 15 is not suitable as it stands, for performing the function required of it. The output of the multiplier 15 is of proper amplitude at each instant to remove the phase deviations of the vector R due to the presence of the vector $E_2$ when applied to the electronic phase shifter 5, but is not necessarily of proper polarity. The polarity of the voltage which is required to perform the phase shifting function is, however, determined by the algebraic sign of $q$ alone. This is true since the input to the voltage multiplier 15 as it is derived from the generator 101 represents $$\frac{dR}{dt}$$

in both magnitude and algebraic sign. That this should be so is evident upon slight consideration of the detailed circuit diagram of Figure 2, wherein the voltage $$\frac{dR}{dt}$$

is derived by differentiating the voltage R, and passing the resultant to the voltage multiplier via a condenser 14, which removes the D.-C. component of the output of the differentiating pentode and accordingly passes to the voltage multiplier 15 an alternating voltage. On the other hand, the voltage applied to the voltage multiplier 15 from the condenser 52, and which represents $$\frac{1}{q}$$

is always positive. Accordingly, any error in algebraic sign of $$\frac{1}{q}\frac{dR}{dt}$$

which may exist must be due to $q$ alone. For this reason polarity correction sensing and gating wave generating circuit 103 is provided, which provides an output voltage dependent upon the algebraic sign of $q$, and which applies this voltage to a polarity correction circuit 104, which passes, to a lead 105, the voltage output of the multiplier 15, i. e., $$\frac{1}{q}\frac{dR}{dt}$$

in one polarity or another, depending upon the polarity of the output of the gating wave generating circuit 103. The voltage available on the lead 105 may then be applied to the electronic phase shifter 5 to produce the necessary phase shifts in the vector R to keep the vector R constantly substantially in phase with the vector $E_1$, thereby to eliminate from the output of the system those distortions which are due to phase shifts of the vector R due to the superposition of the vectors $E_1$ and $E_2$, and their rotations at different rates.

While I have described one specific embodiment of the invention it will be clear that variations thereof, in both general arrangement and specific detail, may be resorted to without departing from the true scope and spirit of the invention as defined in the appended claims.

What I claim and desire to secure by Letters Patent of the United States is:

1. In a frequency modulation receiving system, for receiving the stronger of two overlapping frequency modulated waves and for reducing interference due to the weaker of said signals, where R represents the instantaneous amplitude of the envelope of the overlapping waves, and where $q$ represents the frequency of said envelope and the difference in frequency of said waves, means for generating a voltage proportional to $$\frac{dR}{dt}$$

means for generating a further voltage proportional to $$\frac{1}{q}$$

means for multiplying the amplitudes of said voltages to derive a product voltage, and means for shifting the phase of said overlapping waves in proportion to said product voltage, and in a sense determined by the algebraic sign of $q$.

2. In a frequency modulation receiving system for demodulation of one of two superposed waves $E_1=\sin wt$ and $E_2=a \sin (w+q)t$, with substantial reduction of interference due to the other, where $w$ is a varying frequency and $w+q$ is a second overlapping varying frequency, where $a$ is a fraction less than unity and equal to $$\frac{E_2}{E_1}$$

and where $E_1+E_2=R \sin (wt+\alpha)$, by reduction of $\alpha$, means for developing a voltage proportional to $\alpha$, and means for varying the phase of superposed waves $E_1+E_2$ in response to said voltage in such sense and in such degree as to reduce $\alpha$ substantially to zero.

3. In a frequency modulation receiving system for demodulation of one of two superposed waves $E_1=\sin wt$ and $E_2=a \sin (w+q)t$, where $w$ and $w+q$ are frequency modulated waves, where $a$ is a fraction less than 1 and equal to $$\frac{E_2}{E_1}$$

and where $E_1+E_2=R \sin (wt+\alpha)$, $\alpha$ being the angle between $E_1$ and R, means for developing a voltage proportional to $\alpha$, means for limiting the amplitude of $R \sin (wt+\alpha)$, and means for reducing the angle $\alpha$ in response to said voltage proportional to $\alpha$.

4. In a system for demodulating two frequency modulated waves $E_1=\sin wt$ and $E_2=a \sin (w+q)t$, where $w$ is the frequency of one of said waves, $q$ the beat frequency between said waves, $a$ the ratio of $$\frac{E_2}{E_1}$$

and where the superposed waves may be represented as $E_1+E_2=R \sin (wt+\alpha)$, the combination comprising, a source of superposed waves $E_1+E_2$, an amplitude limiter for said superposed waves, an electronic phase shifter, and a discriminator, all in cascade, and means for continuously controlling said electronic phase shifter to reduce angle $\alpha$ substantially to zero.

5. In a system for demodulating two frequency modulated waves $E_1=\sin wt$ and $E_2=a \sin (w+q)t$, where $w$ is the frequency of one of said waves, $q$ the beat frequency between said waves, $a$ the ratio of $$\frac{E_2}{E_1}$$

and where the superposed waves may be represented as $E_1+E_2=R \sin (wt+\alpha)$, the combination comprising, a source of superposed waves $E_1+E_2$, an amplitude limiter for said superposed waves, an electronic phase shifter, and a discriminator, all in cascade, means for continuously controlling said electronic phase shifter to reduce angle $\alpha$ substantially to zero, said means for continuously controlling comprising means for sensing the algebraic sign of $q$, means for differentiating the envelope of $R \sin (wt+\alpha)$ to obtain a first voltage wave $$\frac{dR}{dt}$$

means for developing a further voltage wave which is a function of $q$, means for multiplying together said first and said further voltage waves to obtain a product function voltage wave proportional to $$\frac{1}{q}\frac{dR}{dt}$$

at every instant of time, means for selectively reversing the polarity of said product function voltage wave in response to said means for sensing, means for applying said product function voltage, after selective polarity reversal by said means for selectively reversing, to control said electronic phase shifter.

6. In a frequency modulation receiving system for one of two superposed waves $E_1=\sin wt$ and $E_2=a \sin (w+q)t$, where $w$ and $w+q$ are frequencies of said frequency modulated waves, where $a$ is a fraction less than 1 and equal to $$\frac{E_2}{E_1}$$

and where $E_1$ and $E_2=R \sin (wt+\alpha)$, $\alpha$ being the angle between $E_1$ and $E_2$, means for developing a voltage proportional to $$\frac{1}{q}\frac{dR}{dt}$$

and means responsive to said voltage for modifying the angle $\alpha$ by shifting the phase of said superposed waves.

7. In combination, means for receiving two overlapping frequency modulated waves, means for developing control signals in response to said two overlapping frequency modulated waves, and means responsive to said control signals for changing the phase of the sum of said two overlapping frequency modulated waves continuously to the phase of the stronger one of said two overlapping frequency modulated waves.

RAYMOND M. WILMOTTE.

REFERENCES CITED

The following references are of record in the file of this patent:

UNITED STATES PATENTS

| Number | Name | Date |
|---|---|---|
| 2,259,000 | Nyquist | Oct. 14, 1941 |
| 2,371,416 | Tunick | Mar. 13, 1945 |
| 2,480,820 | Hollingsworth | Aug. 30, 1945 |